Nov. 28, 1944.  J. E. KLINE ET AL  2,363,975
HONING DEVICE
Filed May 22, 1939  3 Sheets-Sheet 1
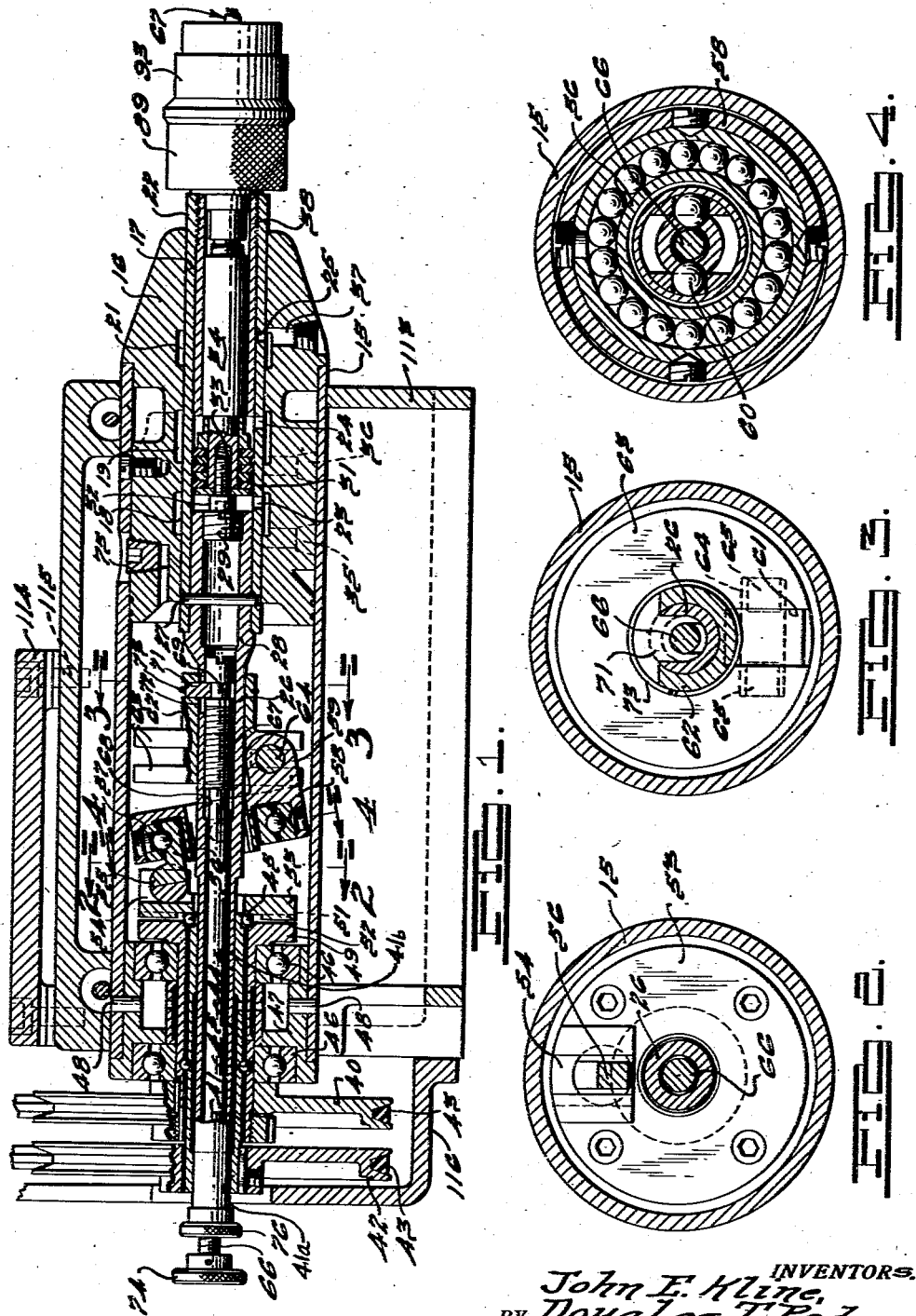
INVENTORS.
John E. Kline,
Douglas T. Peden.
BY Harness, Dickey & Pierce.
ATTORNEYS.

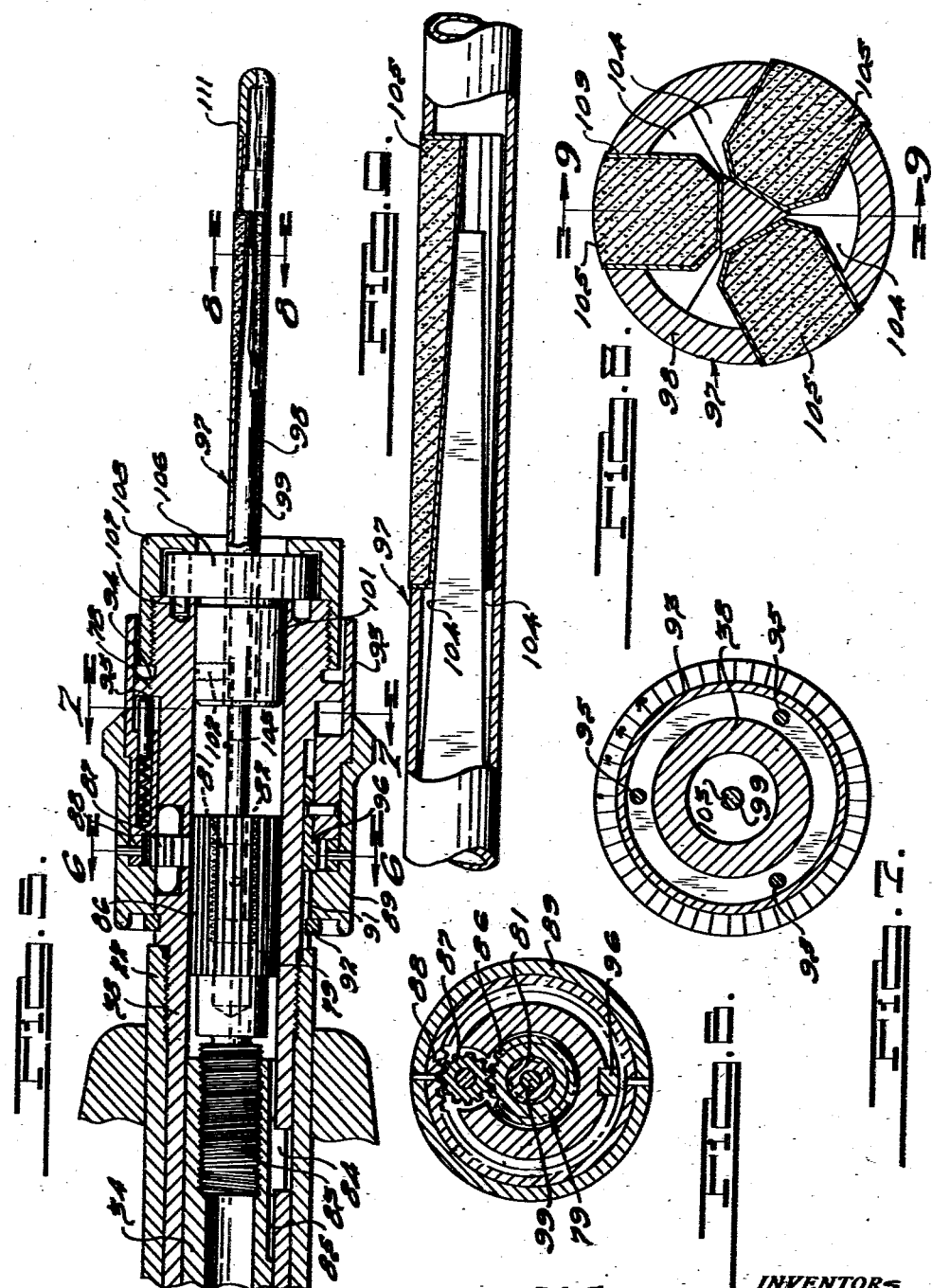

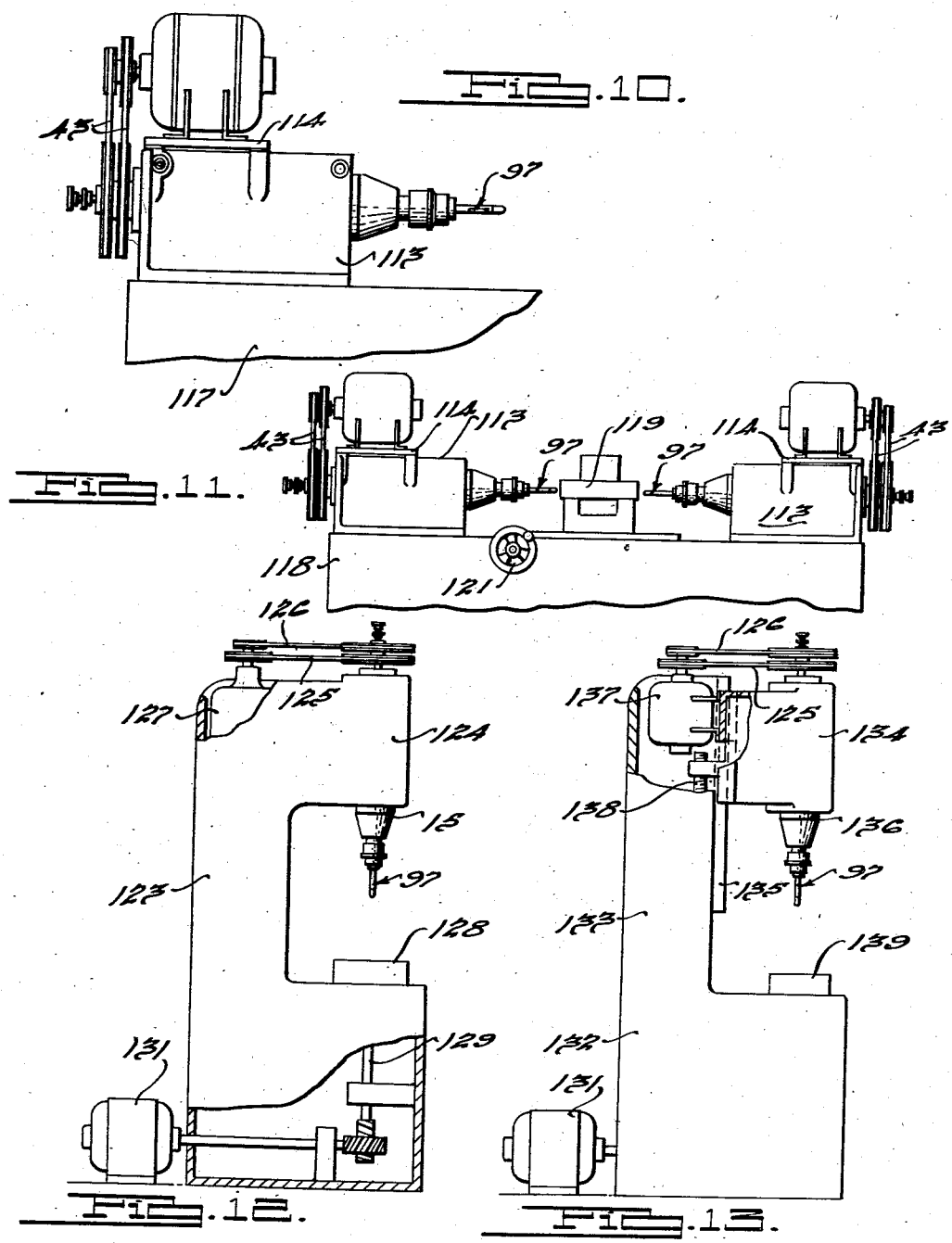

Patented Nov. 28, 1944

2,363,975

UNITED STATES PATENT OFFICE 2,363,975

HONING DEVICE

John E. Kline, Grosse Pointe Farms, and Douglas T. Peden, Ann Arbor, Mich., assignors to Micromatic Hone Corporation, Detroit, Mich., a corporation of Michigan Application May 22, 1939, Serial No. 274,890

12 Claims. (Cl. 51—184.3)

Our invention relates to an operating device, and particularly to a driving spindle which produces a variable reciprocating motion to a tool or workpiece while rotating the same.

The unit spindle produced in accordance with the present invention may be mounted in any manner in a machine to drive a tool or workpiece in rotation and rapid reciprocation. The spindle operation follows the principles embodied in the device and tool of the copending William H. Harris, Jr., application, Serial No. 116,774, filed December 19, 1936, which matured as Patent No. 2,252,176, August 12, 1941, and assigned to the assignee of the present invention. This device and tool produced a type of machining which provided accurate dimensions and a high polished finish.

A tool carried by our present spindle is expanded by the action of a piston when actuated by the pressure of the fluid at one end of the encompassing cylinder. The opposite end of the spindle from that supporting the tool is provided with a driving and adjusting shaft by which the degree of reciprocation of the tool may be regulated. A collar is carried by the shaft having a pivotal connection with the outer raceway of a roller bearing while a ball connection is provided from the inner raceway thereof to a sleeve which rotates relative to the shaft. The raceways and bearing provide a swash plate connection through a pair of balls which drive the shaft and encompassing sleeve at predetermined speeds to thereby provide a reciprocating movement which is relative to the rotational speed. The degree of reciprocation produced in this manner may be varied by adjusting the tilt of the raceway and bearings relative to the sleeve and the shaft.

The spindle is unique in that it is self-contained and may be mounted in many positions in a machine frame, or may be an auxiliary device attachable to a machine. The spindle may be mounted rigidly to have the workpiece moved thereover, the workpiece may be fixed and the spindle adjustable relative thereto or both the workpiece and spindle may be movable relative to each other.

Accordingly, the main objects of my invention are: to provide a self-contained unit which produces a movement in reciprocation and rotation to a tool or workpiece; to provide a self-contained unit for operating an element in rotation and reciprocation in such manner that the relationship between the movements are adjustable; to provide a self-contained unit which produces variable cycles of reciprocation and rotation to a work supporting element or tool, driven through a swash plate, the angle of disposition of which is adjustable; to produce a device in which a collet or tool is rotated or reciprocated in adjustable timed relation, having fluid means for actuating the tool or collet in expansion and contraction; and in general, to provide a self-contained unit for rotating and reciprocating a workpiece or tool in predetermined timed relation and which may be mounted separately or plurally to machine one or a plurality of elements and which may be mounted to have the workpiece or tool moved relative thereto, all of which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a side sectional view of a spindle and a support therefor, embodying features of my invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged sectional view of the structure illustrated in Fig. 3, taken on the line 4—4 thereof;

Fig. 5 is an enlarged view of structure, similar to that illustrated in Fig. 1, with an adjusting head and tool secured thereto;

Fig. 6 is a sectional view of the structure illustrated in Fig. 5, taken on the line 6—6 thereof;

Fig. 7 is a sectional view of the structure illustrated in Fig. 5, taken on the line 7—7 thereof;

Fig. 8 is an enlarged sectional view of the structure illustrated in Fig. 5, taken on the line 8—8 thereof;

Fig. 9 is a reduced sectional view of the structure illustrated in Fig. 8, taken on the line 9—9 thereof;

Fig. 10 is a reduced view of the structure illustrated in Fig. 1, when mounted on a bench, table, or base;

Fig. 11 is a view of structure, similar to that illustrated in Fig. 10, with a pair of the spindles mounted in substantially aligned relation to be moved or have the work move simultaneously or alternately relative thereto;

Fig. 12 is a view of structure, similar to that illustrated in Fig. 10, with the spindle mounted in vertical position and with means for moving the work supporting table relative thereto; and, Fig. 13 is a view of structure, similar to that illustrated in Fig. 12, with the spindle mounted for movement downwardly toward the work supporting table.

A sleeve 15 forms the outer wall of the spindle or device and is preferably cylindrical in form and of small diameter so that simple mounting means may be utilized for its supports. A nose 16 having a central cylindrical aperture 17 and fluid ports 18, 19 and 21 therein, is employed for enclosing the forward or righthand end of the sleeve 15, as viewed in Fig. 1. Within the central aperture 17, a sleeve 22 is mounted having apertures 23, 24 and 25 therein, communicating with the fluid ports 18, 19 and 21, respectively. The sleeve is secured to a hollow shaft 26 by a pin 27 extending through an enlarged end 28 thereof. A threaded plug 29 seals the open end of the hollow shaft 26 and forms a cylinder head. A piston 31 is disposed within the sleeve 22 forwardly of the plug 29 having a head 32 of a bolt 33 which abuts against the plug 29 providing clearance for the end of the piston. Forwardly of the piston, an adjusting head supporting sleeve 38 is disposed between the sleeve 34 and the driving sleeve 22.

The piston 31 is mounted on the end of an internally threaded sleeve 34 which is moved axially thereby to expand a collet or tool carried by the spindle. A conduit (not illustrated) is connected to an aperture 35 which communicates with the fluid port 18 while a similar conduit is connected to the aperture 36 which communicates with the fluid port 19. A third conduit is connected to an aperture 37 which communicates with the third port 21 employed to conduct any fluid which may leak past the sleevs 22 and 38 to a reservoir.

The hollow shaft 26 has a sleeve 41 journaled at 41a and splined thereto at 41b. The shaft has a pulley 42 keyed thereto in driving relation. A suitable belt 43 is employed for driving the pulley 42 in rotation. Over the sleeve 41 a sleeve 44 is mounted for rotational movement relative thereto on bearings 45. The outer surface of the sleeve 44 is supported by roller bearings 46 which are secured to a sleeve 47 which is attached to the end of the sleeve 15 by pins 48. On the rear end of the sleeve 44 a pulley 40 is secured in driving relation being disposed adjacent to the pulley 42 and driven by a belt 43 both of which are driven from a common motor. The pulleys 40 and 42 may, as well as the driving pulleys or either, be of different radial dimensions. The sleeve 44 has on its forward end an annular flange 49 having a slot 51 in its face in which face projections 52 on a washer 53 engage to provide a driving connection. The washer 53 is provided with a cylindrical receptacle 54 in which a ball-shaped projection 55 on an inner raceway 56 is mounted for gyratory sliding movement. The outer raceway 57 of the bearing is secured within a cap 58 having a lug 59 which projects through an aperture 61 in a sleeve 62 provided with spaced flanges 63. A pin 64 having flat faces 65 extends between the flanges 63 when projected through the aperture of the lug 59 to provide a pivotal driving relation therebetween.

A rod 66 extends through the hollow interior of the shaft 26 having a threaded end 67 in engagement with the threads 68 on the inner wall of the shaft. A slot 69 is provided on the end of the rod 66 in which a split washer 71 is mounted through a slot 72 in the sleeve 62 secured in position by a spring ring 73. The split washer 71 locks the sleeve 62 to the rod 66 for longitudinal movement therewith. The rod 66 is the joining means between the sleeve 62 and the cap 58 and no reciprocation could occur except for this threaded connection. By turning the rod 66 by means of a thumb nut 74, the sleeve 62 is moved longitudinally on the shaft 26 to regulate the degree of tilt to the cap 58 on the balls 60 on which the cap is pivoted to thereby regulate the degree of reciprocation of the workpiece or tool on the end of the sleeve 38.

The pulley 40 drives the inner races 56 of the bearing while the pulley 42 drives the shaft 26, and, through the balls 60, the cap 58 in rotation. When both the shaft 26 and raceway 56 are rotated at the same speed, no reciprocation occurs to the sleeve 22. When one is rotated and the other retained stationary the sleeve 22 is rotated and reciprocated in timed relation producing a simple harmonic motion. When the driving speeds are dissimilar, the simple harmonic motion immediately becomes a hunting motion which will repeat itself only after an appreciable time of operation.

A plug 75 closes an aperture in the wall of the nose 16 through which a lubricant may be introduced into the sleeve 15 to have the parts of the mechanism thus far described operate in a lubricating bath. After the rod 66 has been adjusted to provide the desired degree of oscillation to the sleeve 22, a clamping nut 76 may then be tightened to retain the adjustment.

Referring to Figs. 5 to 9, inclusive, we have illustrated the adjusting head 78 as extending from the end of the sleeve 22 on the sleeve 38 which forms the body of the head. The sleeve 38 is hollow and has a hollow gear nut 79 therein in which a nut 81 is secured on the threads 82 thereof. The opposite end of the nut 79 has a threaded extension 83 which projects within the sleeve 34 of the piston 31. The sleeve 34 is held against rotation by a key 84 operating in a slot 85 in the outer wall of the sleeve 34. The outer surface of the gear nut 79 is provided with teeth 86 which are in mesh with the teeth of the pinion 87 the teeth of which engage the teeth of an internal gear 88. An indexing sleeve 89 is mounted on the body of the sleeve 38, being retained against turning movement by a key 91 and against forward movement by a locking ring 92. A locking sleeve 93 extends over an annular flange 94 on the body of the sleeve 38, the opposite end projecting interiorly of the sleeve 89. A plurality of spring-pressed pins 95 force the sleeve 93 to the left, as viewed in the figure. The sleeve carries a gear sector 96 the teeth of which engage the teeth of the internal gear 88 to thereby lock the sleeve 89 against turning movement. When adjustment is to be made, the sleeve 93 is moved toward the right, as viewed in Fig. 5, to release the teeth of the sector 96 from those of the internal gear 88 and by rotating the sleeve, the pinion 87 and the nut 79 are rotated. Since the threads 82 and 83 are of the opposite hand, such rotation moves the nut 79 bodily along with the advancement of the nut 81 which will be advanced double the advancement of the lead of the thread.

The tool 97 may vary in diameter and length conforming to the type of workpiece, the material from which it is manufactured, and the finish desired. The tool herein illustrated embodies a tubular body 98 having a rod 99 adjustable axially therein. The body 98 is supported on a bushing 101 mounted within the forward end of the sleeve 38. A set screw 102 is threaded in the bushing having the end thereof projecting within a slot 103 in the rod 99 to limit the relative movement therebetween. The rearward end of the rod 99 has the nut 81 riveted or otherwise secured thereto. The opposite end of the rod 99 is provided with tapered walls 104, herein illustrated as three in number, employed to engage the rear wall of the abrading stones 105. The slope of the rear wall of the stones preferably conforms to the slope on the rod. The bushing 101 is provided with enlarged end portions 106 having a pin 107 therein which engages the end of the sleeve 38 and which is locked against rotation by the pin and the hollow cup nut 108. The abrading elements 106 have the outer surfaces thereof covered with a sheath of metal 109 which may be soldered, welded, brazed or otherwise secured thereon, or which may be sprayed, plated, or otherwise built up thereon. The end of the tool sleeve 98 is reinforced by a tip 111 which is welded, brazed, or otherwise secured thereto.

It is to be understood that when the collet is employed for holding the work internally to produce external grinding or honing, or externally to produce internal finishing, that the adjusting head 78 is eliminated since no change in adjustment or setting will be required. The collet will have a sleeve 38 which fits within the sleeve 16 of the spindle and a rod 99 will be connected directly to the sleeve 34 to be adjusted axially thereby. The rod 99 will actuate the fingers of the collet to clamp the workpiece thereby.

The spindle thus provided is unique in that it is susceptible to mounting on a bench or any type of supporting base or machine and may be employed as an adjunct to a standard machine, as for example, a drill press whereby one workpiece may have a hold drilled therein while the spindle is finishing a hole therein drilled prior thereto or in another piece. The movement of the drill press slide produces the feed movement of the tool and spindle, the reciprocation and rotation of the tool being produced by the mechanism within the spindle.

In Fig. 1, the spindle is illustrated as being mounted in a housing 113 having a motor bracket 114 secured thereto by screws 115. A guard 116 is secured to the end of the housing for enclosing the pulleys 42 and 45 and also the belts 43 which drive the spindle mechanism. In Fig. 10, a base 117 may be a separate element such as a bench for supporting the housing 113 and spindle to provide a complete machine or the workpieces may be fed over the tool 97 by hand. In Fig. 11, I have illustrated a machine base 118 having mounted thereon a pair of the housings 113 with the tool 97 facing toward each other and a work supporting head 119. The head clamps a workpiece which may be advanced through the operation of a hand wheel 121 and a lead screw (not shown) first over one tool 97 and then over the opposite tool to machine the same or different cylindrical surfaces thereby. The surfaces may be roughed honed by one tool and finish honed by the other or one tool may be of the boring type to bore a hole which may be finished on the adjacent honing tool without removing the workpiece from the clamping head 119.

In Fig. 12, we have illustrated a machine 123 having the spindle mounted in a head 124 driven through belts 125 and 126 by a motor 127 fixed within the machine standard. In this arrangement, the spindle 15 is retained against axial movement while a workpiece supporting plate 128 may be raised and lowered by means of a lead screw 129 driven by a motor 131. In this arrangement, the spindle produces movements in rotation and reciprocation of the tool, while the workpiece, clamped on the element 128, is advanced over the tool to provide the feed movement. In Fig. 13, a somewhat similar arrangement is illustrated, that of a machine 132 having a standard 133 on which a head 134 is movable vertically on ways 135. The head supports a spindle 136 and also a motor 137 which drives through belts 125 and 126 the tool 97. A lead screw 138 is operated by a motor 131 to raise or lower the head 134 on the ways 135 to feed the tool 97 over the workpiece retained in the holder 139 as the tool is rotated and reciprocated.

From Figs. 10 to 13, inclusive, it will be noted that the spindle along with a tool or collet provides a self-contained unit which may be mounted on a bench, table, or machine bed to produce a complete machine. The unit produces a movement in rotation and reciprocation to the tool or workpiece while the feeding of one relative to the other is effected by hand, a lead screw or similar means. It is very evident that the unit may be attached to any device to augment the machining thereof such as by finishing a hole to accurate dimensions and fine finish. This could be accomplished on a drill press, for example, where the hole was drilled just prior to the finishing operation.

When a double spindle machine is employed, as illustrated in Fig. 11, one or both tools 97 and 110 may be honing tools while one or both may be a boring, a drilling, a reaming, or a roll burnishing tool, in combination with each other or with a honing tool.

While we have illustrated several embdiments of our invention, it will be apparent to those skilled in the art that various changes, omissions, additions, and substitutions may be made therein without departing from the spirit and scope of our invention as set forth in the accompanying claims.

What is claimed is:

1. A device for operating an element in rotation and reciprocation embodying in combination, an outer sleeve, a hollow shaft in said sleeve for supporting and driving said element, a pulley for driving said shaft, a second sleeve over said shaft, a pulley driving said second sleeve, a collar connected to said shaft, and a swash plate pivotally interconnecting said second sleeve and said collar.

2. A device for operating an element in rotation and reciprocation embodying in combination, an outer sleeve, a hollow shaft in said sleeve for supporting and driving said element, a pulley for driving said shaft, a second sleeve over said shaft, a pulley driving said second sleeve, a collar connected to said shaft, a swash plate pivotally interconnecting said second sleeve and said collar, and means within said shaft for adjusting said collar longitudinally for varying the tilt of said swash plate and the length of a cycle of reciprocation.

3. A device for operating an element in rotation and reciprocation embodying in combination, an outer sleeve, a hollow shaft in said sleeve for supporting and driving said element, a pulley for driving said shaft, a second sleeve over said shaft, a pulley driving said second sleeve, a collar connected to said shaft, a swash plate pivotally interconnecting said second sleeve and said collar, means within said shaft for adjusting said collar longitudinally for varying the tilt of said swash plate and the length of a cycle of reciprocation, and means to seal the ends of said outer sleeve to provide a reservoir for a lubricant.

4. A device for operating an element in rotation and reciprocation embodying in combination, an outer sleeve, a hollow shaft in said sleeve for supporting and driving said element, a pulley for driving said shaft, a second sleeve over said shaft, a pulley driving said second sleeve, a collar connected to said shaft, a swash plate pivotally interconnecting said second sleeve and said collar, a cylinder disposed within an extension of said shaft, a piston in said cylinder, means for conducting fluid to and from both sides of the piston for producing the longitudinal movement thereof while the shaft is driven in rotation and reciprocation, a tool body supported on the extension of said shaft, and adjusting means for said tool actuated by said piston.

5. In a device having a shaft which moves a cylinder in reciprocation and rotation, a piston in said cylinder, an adjusting head carried by said cylinder having a rotatable element secured to said piston by which the rotatable element is moved longitudinally, a tool carried by said head, a rod on said tool secured to said rotatable element, and means on said adjusting head for rotating said element to adjust said rod longitudinally, said rod being also adjusted longitudinally when said element is moved longitudinally by said piston.

6. In a device having a shaft which moves a cylinder in reciprocation and rotation, a piston in said cylinder, an adjusting head carried by said cylinder having a rotatable element secured to said piston for moving said piston longitudinally, a tool carried by said head, a rod on said tool secured to said rotatable element, means on said adjusting head for rotating said element to adjust said rod longitudinally, and fluid means for actuating said piston, element and rod longitudinally.

7. A spindle having an outer cylindrical wall, a hollow shaft extending from one end of the spindle, driving means on the opposite end of the spindle for driving said shaft in rotation, means within said spindle for reciprocating said shaft, drive means for said reciprocating means, means for driving said two driving means at relative speeds to provide a movement in reciprocation timed with that in rotation, an axially movable element within said shaft, and means within said spindle for reciprocating said movable element.

8. A spindle having an outer cylindrical wall, a hollow shaft extending from one end of the spindle, driving means on the opposite end of the spindle for driving said shaft in rotation, means within said spindle for reciprocating said shaft, drive means for said reciprocating means, means for driving said two driving means at relative speeds to provide a movement in reciprocation timed with that in rotation, an axially movable element within said shaft, means within said spindle for reciprocating said movable element, a tool supporting head on said shaft, a tool supported by said head, abrading elements on said tool, and an adjusting element for said abrading elements operated by said axially movable element while said abrading elements are rotated and reciprocated.

9. A spindle having an outer cylindrical wall, a hollow shaft extending from one end of the spindle, driving means on the opposite end of the spindle for driving said shaft in rotation, means within said spindle for reciprocating said shaft, drive means for said reciprocating means, means for driving said two driving means at relative speeds to provide a movement in reciprocation timed with that in rotation, an axially movable element within said shaft, means within said spindle for reciprocating said movable element, a tool supporting head on said shaft, a tool supported by said head, abrading elements on said tool, an adjusting element for said abrading elements operated by said axially movable element, and means within said tool supporting head for adjusting the position of said adjusting element on said axially movable element.

10. A spindle having an outer cylindrical wall, a shaft extending through said spindle, driving means on one end of the shaft, a sleeve over said shaft, driving means for said sleeve, a cup having pivotal relation with the shaft, and a bearing disposed in said cup the inner raceway of which is connected to said sleeve.

11. A spindle having an outer cylindrical wall, a shaft extending through said spindle, driving means on one end of the shaft, a sleeve over said shaft, driving means for said sleeve, a cup having pivotal relation with the shaft, a bearing disposed in said cup, means connecting the inner raceway of said bearing with said sleeve, and means for driving said shaft and sleeve at different speeds.

12. A spindle having an outer cylindrical wall, a shaft extending through said spindle, driving means on one end of the shaft, a sleeve over said shaft, driving means for said sleeve, a cup having pivotal relation with the shaft, a bearing disposed in said cup, means connecting the inner raceway of said bearing with said sleeve, means for driving said shaft and sleeve at different speeds, and means extending through said shaft for adjusting the tilt of said cup.

JOHN E. KLINE.
DOUGLAS T. PEDEN.